US010010965B2

(12) United States Patent
Fongaro et al.

(10) Patent No.: US 10,010,965 B2
(45) Date of Patent: Jul. 3, 2018

(54) MOVEMENT DEVICE, PARTICULARLY FOR CUTTING TORCHES OF THE PLASMA TYPE AND THE LIKE

(71) Applicants: FICEP S.P.A., Gazzada Schianno (IT); GUEDEL A.G., Langenthal (CH)

(72) Inventors: Stefano Fongaro, Castronno (IT); Walter Zulauf, Ursenbach (CH); Christian Colombo, Milan (IT)

(73) Assignees: FICEP S.P.A., Gazzada Schianno (IT); GUEDEL A.G., Langenthal (CH)

( * ) Notice: Subject to any disclaimer, the term of this patent is extended or adjusted under 35 U.S.C. 154(b) by 116 days.

(21) Appl. No.: 14/916,104

(22) PCT Filed: Sep. 5, 2013

(86) PCT No.: PCT/IT2013/000234
§ 371 (c)(1),
(2) Date: Mar. 2, 2016

(87) PCT Pub. No.: WO2015/033360
PCT Pub. Date: Mar. 12, 2015

(65) Prior Publication Data
US 2016/0214201 A1 Jul. 28, 2016

(51) Int. Cl.
B23K 10/00 (2006.01)
B23K 7/00 (2006.01)
(Continued)

(52) U.S. Cl.
CPC ............... *B23K 10/00* (2013.01); *B23K 7/00* (2013.01); *B23K 7/10* (2013.01); *B23K 9/013* (2013.01);
(Continued)

(58) Field of Classification Search
CPC . B23K 10/00; B23K 7/00; B23K 7/11; B23K 9/013; B23K 37/0241; B23K 37/0247; B23K 37/0258; B23K 37/0288
(Continued)

(56) References Cited

U.S. PATENT DOCUMENTS 2,517,910 A 8/1950 Miller
3,901,098 A 8/1975 Jinkins
(Continued)

FOREIGN PATENT DOCUMENTS

DE 24 03 504 A1 7/1975
EP 1 428 625 A1 6/2004
WO WO 2013/041404 A2 3/2013

OTHER PUBLICATIONS

International Search Report (PCT/ISA/210) for PCT/IT2013/000234 dated Aug. 6, 2014.

*Primary Examiner* — Mark Paschall
(74) *Attorney, Agent, or Firm* — Koppel, Patrick, Heybl & Philpott

(57) ABSTRACT

A movement device, particularly for cutting torches, comprising a working head that can move along three Cartesian axes which are mutually perpendicular and supports a cutting torch for cutting mechanical pieces, elements being further comprised for combined rotary and translational motion of the cutting torch with respect to the working head which comprises a first pinion which is adapted to transmit the motion to a disk-like element supporting an articulated parallelogram structure which in turn supports the cutting torch, and a second pinion which is arranged coaxial to the first pinion and is actuated by further drive elements, the second pinion actuating a conical pair formed by a third and a fourth pinion, the fourth pinion transmitting the motion to
(Continued)

mechanical transmission elements which are integral with the articulated parallelogram structure.

4 Claims, 3 Drawing Sheets

(51) Int. Cl.
*B23K 7/10* (2006.01)
*B23K 9/013* (2006.01)
*B23K 37/02* (2006.01)

(52) U.S. Cl.
CPC ...... *B23K 37/0241* (2013.01); *B23K 37/0247* (2013.01); *B23K 37/0258* (2013.01); *B23K 37/0288* (2013.01)

(58) Field of Classification Search
USPC ............ 219/121.39, 121.44, 121.48, 121.56, 219/121.58
See application file for complete search history.

(56) References Cited

U.S. PATENT DOCUMENTS

| | | | |
|---|---|---|---|
| 7,838,793 B2* | 11/2010 | Tudhope | C23C 8/36 118/723 R |
| 2012/0242015 A1* | 9/2012 | Fagan | B23K 37/0288 266/59 |
| 2014/0263206 A1* | 9/2014 | Blevins | B23K 10/006 219/121.56 |

* cited by examiner

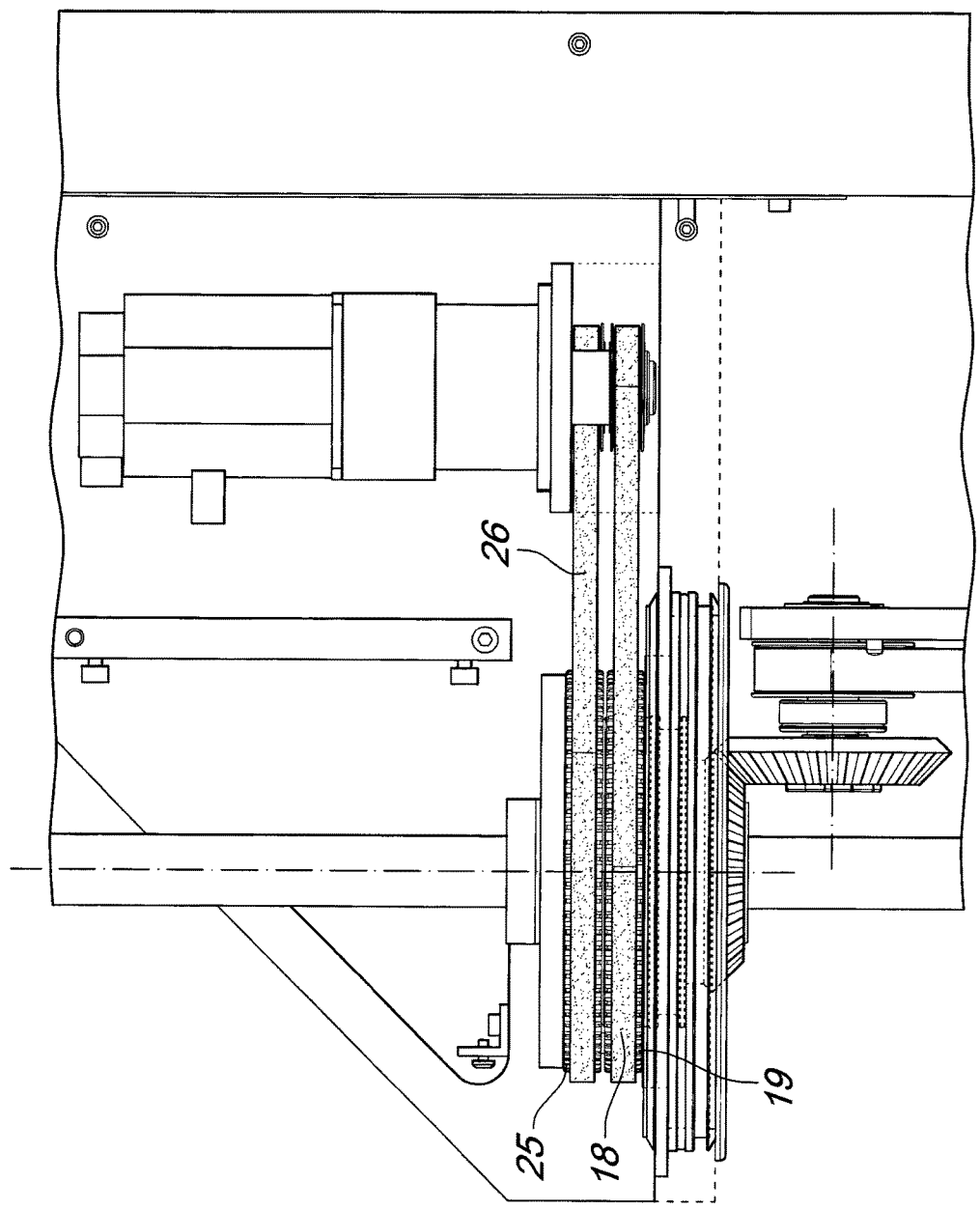

MOVEMENT DEVICE, PARTICULARLY FOR CUTTING TORCHES OF THE PLASMA TYPE AND THE LIKE

The present invention relates to a movement device for plasma cutting and the like, for cuts in two and three dimensions.

Nowadays, for metal cutting in general, such as steel and other metallic alloys, or for cutting other materials, a huge variety of methods is available which do not require physical contact between a tool and the piece to be cut.

Of these methods, plasma cutting is known, which consists, substantially, of ejecting a gas at high speed from a nozzle and creating an electric arc in the gas between an electrode and the surface to be cut, in such a manner as to transform the gas into plasma.

The plasma thus obtained transfers heat to the metallic material until it is brought to melting temperature and thus its continuity is broken.

In this technology, as in other similar technologies, the nozzle through which the plasma flow exits is provided on a cutting torch which is supported by a movement device of the multi-body type which, by way of a series of motors and kinematic linkages, enables the movement, positioning and orientation in the space of the torch proper.

Such technology is not however devoid of drawbacks, among which is the fact that, if the torch has to follow a preset cutting path, conventional movement devices do not allow a fluidity of movement of the focal point of the torch which is such as to obtain a cut executed in continuous movement which is sufficiently free from burring and cutting inaccuracies owing to pauses in and/or resumptions of the plasma flow along the preset cutting path.

Another drawback of the conventional technology consists in that, if inclined cuts are required with continual changes of inclination, the inertia of the individual rigid bodies that make up the abovementioned multi-body system and the continual accelerations and decelerations to which the cutting torch is subjected result in inaccuracies of positioning in the space of the focal point of the torch, with consequent reduction in the quality of the cut made.

This drawback is essentially due to the inertia of the system, in that, for each degree of freedom of the system, there is an electric motor which is generally mounted proximate to the joint on which the degree of freedom is provided.

In this way, the electric motors, the mass of which is significant, weigh down the system considerably thus forcing it to operate with reduced acceleration and deceleration values, with consequent lengthening of working times.

Another drawback of the described movement devices consists in that, during the movement of the torch, the supply cable of the latter undergoes a series of furls onto itself and tensionings which are such as to necessitate rotations of the cutting torch that are adapted to loosen said cable, so as to prevent it from breaking.

In fact, typically, with current systems it is possible to make the cutting torch perform at most two or three turns on itself before the cable breaks.

The above drawbacks are overcome by WO 2013/041404 by the name of the same applicant as the present application.

Such application describes a movement device which is adapted to plasma torches, comprising a working head that can move along three Cartesian axes which are mutually perpendicular and which supports a cutting torch for cutting mechanical pieces and the like. The device further comprises means for the combined rotary and translational motion of the cutting torch with respect to the working head in order to vary the inclination of the cutting flow with respect to the mechanical piece or the like being worked on. The center of instantaneous rotation of the cutting torch, with respect to which the means for combined rotary and translational motion operate, substantially coincides with the focal point of the cutting torch.

However, it has been found that the rotation of the working head, to form a complete revolution, about its own inclination axis, is not possible with the conventional implementation solutions described above, in that the rotation of the working head is obstructed if the head itself wanted to perform a complete rotation.

The rotation is thus limited to a portion of a complete revolution.

The aim of the present invention is to provide a movement device that is capable of overcoming the limitations and drawbacks of the known art, by making it possible for the cutting head to perform a rotation of a complete revolution.

Within this aim, an object of the present invention is to devise a movement device that is particularly adapted to plasma cutting torches for straight and inclined cuts but which can with suitable modifications also be used for cutting technologies other than plasma cutting such as, for example, laser cutting torches, gas cutting torches or oxy-hydrogen flame cutting torches and the like.

This aim and these and other objects which will become better apparent hereinafter are achieved by a movement device, particularly for cutting torches, comprising a working head that can move along three Cartesian axes which are mutually perpendicular and supports a cutting torch for cutting mechanical pieces and the like, means being further comprised for combined rotary and translational motion of said cutting torch with respect to said working head in order to vary the inclination of the cutting flow with respect to said mechanical piece, characterized in that said means for combined rotary and translational motion comprise a first pinion which is adapted to transmit the motion to a disk-like element supporting an articulated parallelogram structure which in turn supports said cutting torch, in order to perform a complete rotation of said disk-like element and thus of said torch with respect to said working head, and a second pinion which is arranged coaxial to said first pinion and is actuated by further drive means, said second pinion actuating a conical pair formed by a third and a fourth pinion, said fourth pinion transmitting the motion to mechanical transmission elements which are integral with said articulated parallelogram structure.

Further characteristics and advantages of the present invention will become better apparent from the detailed description of a preferred, but not exclusive, embodiment of a movement device, particularly for cutting torches of the plasma type, which is illustrated by way of non-limiting example in the accompanying drawings wherein:

FIG. 3 is a partial side elevation view of the movement device shown in FIG. 1.

Figure 1:
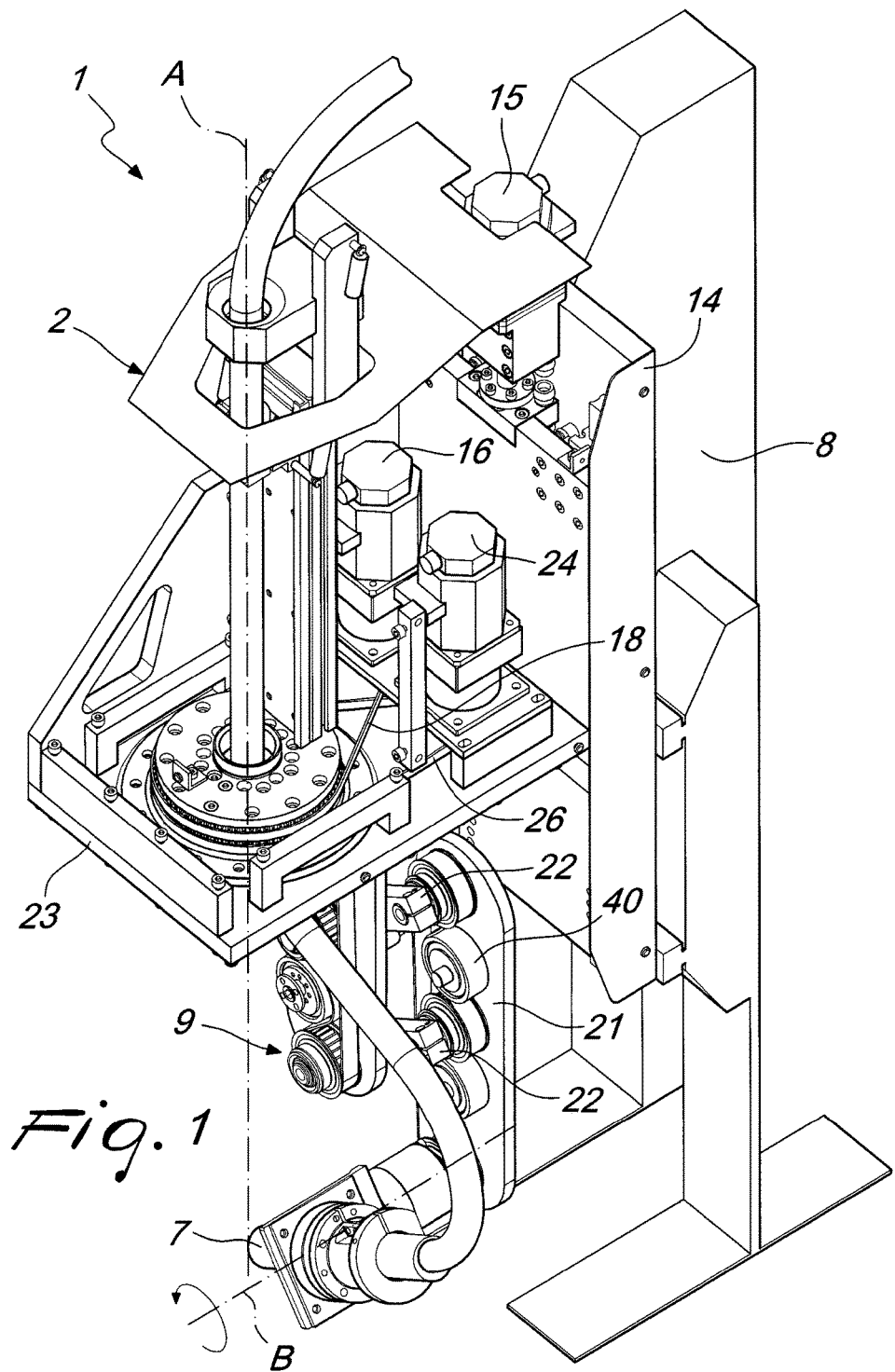
FIG. 1 is a perspective view of the movement device, particularly for cutting torches of the plasma type, according to the invention.
Figure 2:
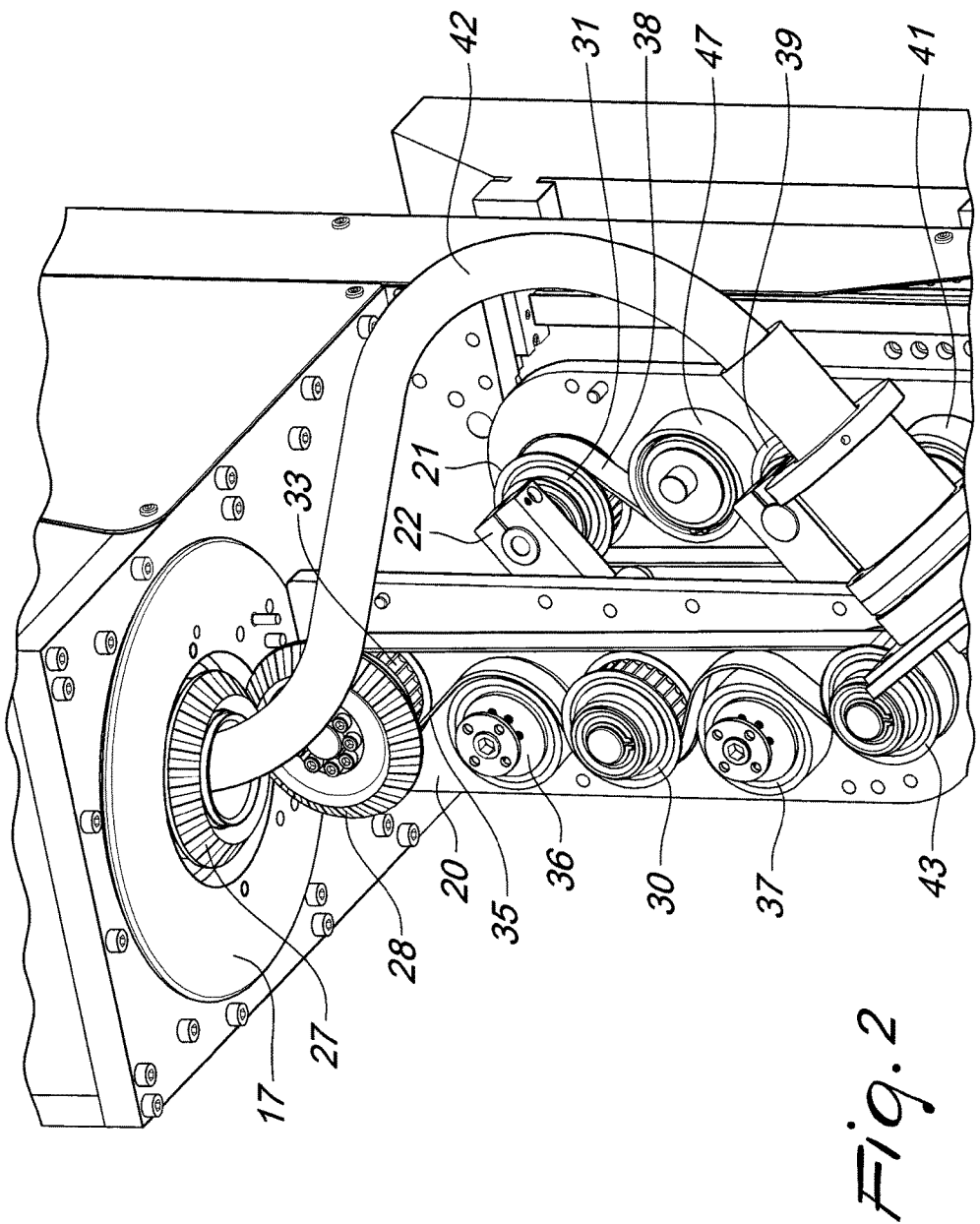
FIG. 2 is a partial perspective view from below of the movement device shown in FIG. 1.

With reference to the figures, the movement device, particularly for cutting torches of the plasma type, generally designated by the reference numeral 1, comprises a working head 2 that can move along three Cartesian axes which are mutually perpendicular and supports a cutting torch 7 for cutting mechanical pieces and the like.

More precisely, as will be better described later, the working head 2 is associated with a frame 8 which supports a workstation that is known to the person skilled in the art and, thus, is not described in detail.

Moreover, means 9 are comprised for the combined rotary and translational motion of the cutting torch 7 with respect to the working head 2 in order to vary the inclination of the cutting flow with respect to the piece being worked on.

During every movement of the cutting torch 7, which in the example embodiment shown here is of the plasma type but which in other embodiments, not shown, can also be of the laser, gas, oxyhydrogen flame or other type, it is always trained on the same point without ever deviating from or interrupting the preset cutting path.

More specifically, the working head 2 comprises a body 14 which is associated slideably with the frame 8.

The body 14 can perform a translational movement vertically by way of first motor means 15 which are accommodated inside the body 14.

The means 9 for combined rotary and translational motion of the working head 2 comprise second motor means 16 which are adapted to act on a disk-like element 17 to which the cutting torch 7 is connected, as will be described below.

In substance, the second motor means 16 impart a complete and continuous rotation on the cutting torch 7, about an axis A.

To this end the second motor means 16 are connected, by way of for example, a belt 18, to a first pinion 19 which is supported by the disk-like element 17.

The disk-like element 17 in turn is integrally connected to a first arm 20 of an articulated parallelogram structure comprising a second arm 21 which is connected to the first arm 20 by way of a pair of linkages 22.

The first and the second arm 20 and 21 are actuated by mechanical transmission elements associated with them.

The second arm 21 supports, at its lower end, the cutting torch 7.

The first arm 20 of the articulated parallelogram structure is thus made to rotate, according to an angle of 360 degrees, by the disk-like element 17 following the actuation imparted by the second motor means 16 to the first pinion 19.

The disk-like element 17 is supported by a supporting element 23, which forms part of the body 14 and is arranged parallel to the working surface on which the cutting torch 7 acts.

The supporting element 23 further supports the second drive means 16 and third drive means 24 which are adapted to actuate a second pinion 25, which is arranged coaxial to and overlaid on the first pinion 19 and is actuated by a belt 26.

The second pinion 25 puts a conical pair in rotation which is constituted by a third pinion 27, which is arranged coaxial to the first and to the second pinion 19 and 25 and is directly actuated by the second pinion 25, and a fourth pinion 28, which is arranged with its axis perpendicular to the axis of the third pinion 27 and is meshed by it.

The fourth pinion 28 is supported by the first arm 20 of the articulated parallelogram.

On the fourth pinion 28 the mechanical transmission elements engage that transmit the motion from the first arm 20 to the second arm 21 of the articulated parallelogram.

In the embodiment proposed, the articulated parallelogram structure comprises the two linkages 21 and 22 which are integral in rotation, at their ends, with first and second driven pulleys 30 and 31, which are respectively arranged on the arms 20 and 21, and are actuated by a driving pulley 33 which is actuated by the fourth pinion 28.

The first driven pulley 30 of the first arm 20 is connected to the upper linkage 22, which in turn is connected to the driven pulley 31 of the second arm 21.

A belt transmission 35 transmits the motion from the driving pulley 33 to the driven pulley 30, with the use of first, second and third tensioning and transmission pulleys 36, 37 and 43 which are arranged on the first arm 20.

An additional belt transmission 39 connects, on the second arm 21, the second driven pulley 31 to a third driven pulley 39 (to which the lower linkage 22 is connected), by way of interposition of fourth and fifth tensioning and transmission pulleys 40 and 41.

The first and the second pinion 19 and 25, as well as the third pinion 27, which are arranged mutually coaxially, are provided with a central hole through which a supply cable 42 passes which powers the torch 7.

The movement device according to the invention thus makes it possible to achieve a complete and continuous rotation of the working head, thanks to the presence of the conical pair which makes it possible to free up the space in a position underlying the disk-like element 17.

In this manner the cutting torch 7 can reach any point of the working surface without having to invert the direction of rotation of the working head.

The cutting torch is thus capable of performing a complete rotation about the axis A and a rotation about the axis B, shown in FIG. 1.

In the rotation movement about the axis B the torch remains contained in a plane that is always perpendicular to the cutting line that the torch has to follow.

In other words, the angle of inclination of the torch has no influence on the orientation of the rotation axis A.

This means that the torch, irrespective of the inclination that it can assume with respect to the vertical to the working surface, is always in a position such that its orientation with respect to the cutting line is perpendicular to a line that is tangential to the cutting line, at every point of the cutting line.

In practice it has been found that the movement device, particularly for cutting torches of the plasma type, according to the invention, fully achieves the set aim and objects.

The movement device, particularly for cutting torches, for example of the plasma type, thus conceived is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. A movement device, particularly for cutting torches, comprising:
   a working head that can move along three Cartesian axes which are mutually perpendicular, said working head comprising a body which is associated slideably with a frame, wherein said body performs a translational movement vertically by way of first drive means and a combined rotary and translational movement by way of second drive means, each of which is accommodated in said body;
   an articulated parallelogram structure comprising a first arm and a second arm, wherein said first arm and said second arm are connected by linkages and each of which are actuated by mechanical transmission elements within them;

a cutting torch supported by a lower end of said second arm;

a disk like element connected to said cutting torch, said disk like element integrally connected to said first arm, wherein said second drive means are adapted to act on said disk like element;

a supporting element which forms a part of said body and is arranged parallel to a working surface on which said cutting torch arts, wherein said supporting element supports said disk like elemant and further supports said second drive means and third drive means;

a first pinion supported by said disk like structure, wherein said first pinion is actuated by said second drive means, causing said first arm to rotate;

a second pinion arranged coaxial to and overlaid on said first pinion, which is actuated by said second drive means and said third drive means;

a third pinion arranged coaxial to said first pinion and said second pinion, wherein said third pinion is directly actuated by said second pinion; and a fourth pinion which is arranged with its axis perpendicular to an axis of said third pinion, wherein said fourth pinion is supported by said first arm and is actuated by said second pinion.

2. The device according to claim 1, wherein said first, second and third pinion are provided with a central hole which is adapted to allow the passage of a supply cable of said cutting torch.

3. The device according to claim 1, wherein said mechanical transmission elements of said articulated parallelogram structure comprise, integral with said first arm, a driving pulley connected to said fourth pinion and a driven pulley, said driven pulley being connected, by one of said linkages, to a driven pulley which is integral with said second arm, a second of said linkages being connected between a transmission pulley of said first arm and a driven pulley of said second arm.

4. The movement device according to claim 1, wherein said cutting torch is of the plasma type.

* * * * *